(12) United States Patent
Ebbs

(10) Patent No.: US 12,319,329 B1
(45) Date of Patent: Jun. 3, 2025

(54) APPARATUSES AND SYSTEMS FOR A KICKSLED WITH A DETACHABLE TRAILER

(71) Applicant: Lisa Ebbs, Anchorage, AK (US)

(72) Inventor: Lisa Ebbs, Anchorage, AK (US)

( * ) Notice: Subject to any disclaimer, the term of this patent is extended or adjusted under 35 U.S.C. 154(b) by 0 days.

(21) Appl. No.: 18/490,187

(22) Filed: Oct. 19, 2023

(51) Int. Cl.
  *B62B 13/06* (2006.01)
  *B62B 17/06* (2006.01)

(52) U.S. Cl.
  CPC ............ *B62B 13/06* (2013.01); *B62B 17/062* (2013.01); *B62B 2202/42* (2013.01); *B62B 2205/30* (2013.01)

(58) Field of Classification Search
  CPC ......... B62B 9/04; B62B 13/06; B62B 17/062; B62B 2205/30
  See application file for complete search history.

(56) References Cited

U.S. PATENT DOCUMENTS

| | | | | |
|---|---|---|---|---|
| 1,606,425 A * | 11/1926 | Johanson | ................ | B62B 13/06 D12/10 |
| 2,480,179 A * | 8/1949 | Anderson | ............... | B62B 13/06 280/14.27 |
| 2,616,715 A * | 11/1952 | Billings | .................. | B62B 13/06 280/28.15 |
| 3,042,420 A * | 7/1962 | Akmentin | ............... | B62B 13/10 280/16 |
| 3,047,303 A * | 7/1962 | Pliska | ..................... | B62B 13/06 280/845 |
| 3,081,107 A * | 3/1963 | Cantelli | .................. | B62B 13/06 280/21.1 |
| 3,632,125 A * | 1/1972 | Krippelz | ................. | B62B 13/06 280/14.1 |
| 9,296,407 B1 * | 3/2016 | Stucky | .................... | B62B 13/06 |
| 2012/0091671 A1 * | 4/2012 | Soloviev | ................. | B62B 13/16 280/20 |
| 2016/0144882 A1 * | 5/2016 | Holub | .................. | B62B 17/063 280/845 |

* cited by examiner

*Primary Examiner* — Jeffrey J Restifo
(74) *Attorney, Agent, or Firm* — Lowenstein Sandler LLP

(57) ABSTRACT

An apparatus for a kicksled with a detachable trailer may include a pair of runners, including a first runner and a second runner that are oriented parallel to each other. The apparatus may include a first cross member, including a first end and a second end where the first end is disposed on the first runner, and the second end is disposed on the second runner. The apparatus may include a pair of trailer attachment arms to which a trailer may be detachably connectable. The trailer may be able to hold a child or small pet. The apparatus may include a pair of riding platform disposed on the pair of runners. The user may push the apparatus from behind and may ride on the riding platforms when the apparatus reaches a gliding speed.

20 Claims, 8 Drawing Sheets

APPARATUSES AND SYSTEMS FOR A KICKSLED WITH A DETACHABLE TRAILER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

BACKGROUND OF THE DISCLOSURE

The present disclosure generally relates to vehicles, and more particularly to apparatuses and systems for a kicksled with a detachable trailer.

It is difficult to transport children or small pets over snow using conventional means, such as strollers or wagons, due to their reliance on wheels. While some runner-equipped child and pet transport systems exist, they involve several disadvantages. First, an adult user must be on skis in order to pull these ski systems. Not all users are able to use skis, and skis can be cumbersome. Second, pulling a trailer requires the user to expend a large amount of energy, and be very skilled at skiing. Third, in order for the user to access the trailer (e.g., to interact with the child or pet, adjust the trailer, or retrieve an object in the trailer), the user must detach from the harness and poles connecting to the trailer and walk around to the side or back of the trailer, which is cumbersome due to the user wearing skis.

What is needed, then, are apparatuses and systems for a kicksled with a detachable trailer.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is an apparatus. The apparatus may include an apparatus for a kicksled with a detachable trailer. The apparatus may include a pair of runners. The pair of runners may include a first runner and a second runner. The first runner and the second runner may be oriented parallel to each other. The apparatus may include a first cross member. The first cross member may include a first end and a second end disposed opposite the first end. The first end may be disposed on the first runner, and the second end may be disposed on the second runner. The apparatus may include a pair of trailer attachment arms. The pair of trailer attachment arms may include a first trailer attachment arm disposed on the first runner, and a second trailer attachment arm disposed on the second runner. A trailer may be detachably connectable to the first trailer attachment arm and the second trailer attachment arm. The apparatus may include a first riding platform disposed on the first runner.

Another aspect of the disclosure includes another apparatus. The apparatus may include an apparatus for a kicksled with a trailer. The apparatus may include a pair of runners. The pair of runners may include a first runner and a second runner. The first runner and the second runner may be oriented parallel to each other. The apparatus may include a pair of cross members. The pair of cross members may include a first cross member and a second cross member. Each of the first cross member and the second cross member may include a first end and a second end disposed opposite the first end on the respective cross member. The first end may be disposed on the first runner, and the second end may be disposed on the second runner. The apparatus may include a pair of trailer attachment arms. The pair of trailer arm attachments may include a first trailer attachment arm disposed on the first runner and a second trailer attachment arm disposed on the second runner. The apparatus may include a trailer connected to the first trailer attachment arm and the second trailer attachment arm. The apparatus may include a pair of riding platforms. The pair of riding platforms may include a first riding platform and a second riding platform. The first riding platform may disposed on a top and back portion of the first runner. The second riding platform may be disposed on a top and back portion of the second runner.

Another aspect of the disclosure includes another apparatus. The apparatus may include an apparatus for a kicksled with a detachable trailer. The apparatus may include a pair of runners. The pair of runners may include a first runner and a second runner. The first runner and the second runner may be oriented parallel to each other. The apparatus may include a first cross member. The first cross member may include a first end and a second end disposed opposite the first end. The first end may be disposed on the first runner, and the second end may be disposed on the second runner. The apparatus may include a pair of trailer attachment arms. The pair of trailer attachment arms may include a first trailer attachment arm disposed on the first runner and a second trailer attachment arm disposed on the second runner. Each of the first trailer attachment arm and the second trailer attachment arm may include a means for detachably connecting a trailer to the respective trailer attachment arm. The apparatus may include a first riding platform disposed on the first runner and a second riding platform disposed on the second runner.

One or more of the apparatuses disclosed herein may overcome some of the disadvantages of prior art apparatuses for transporting children or pets across snowy or icy terrain. The apparatuses may allow a trailer to selectably attach to the apparatus to allow a user to push the apparatus from behind the trailer and between the runners. The apparatus may also allow the user to stand on the riding platforms and ride on the apparatus for a certain distance when the apparatus has reached a gliding speed. Since the apparatus is pushed by the user from behind the apparatus, the user does not use skis to pull or push the apparatus. Thus, the user does not need to know how to ski, nor is the user encumbered by skis. Also, pushing the apparatus from behind may be easier than pulling a conventional trailer and also allows the user to ride on the apparatus. Lastly, the user can easily access the trailer to interact with the child or pet inside, or retrieve objects carried on the apparatus instead of having to detach from a conventional pulled trailer and walk around the trailer while wearing skis.

Numerous other objects, advantages and features of the present disclosure will be readily apparent to those of skill in the art upon a review of the following drawings and description of various embodiments.

DETAILED DESCRIPTION

Figure 1:
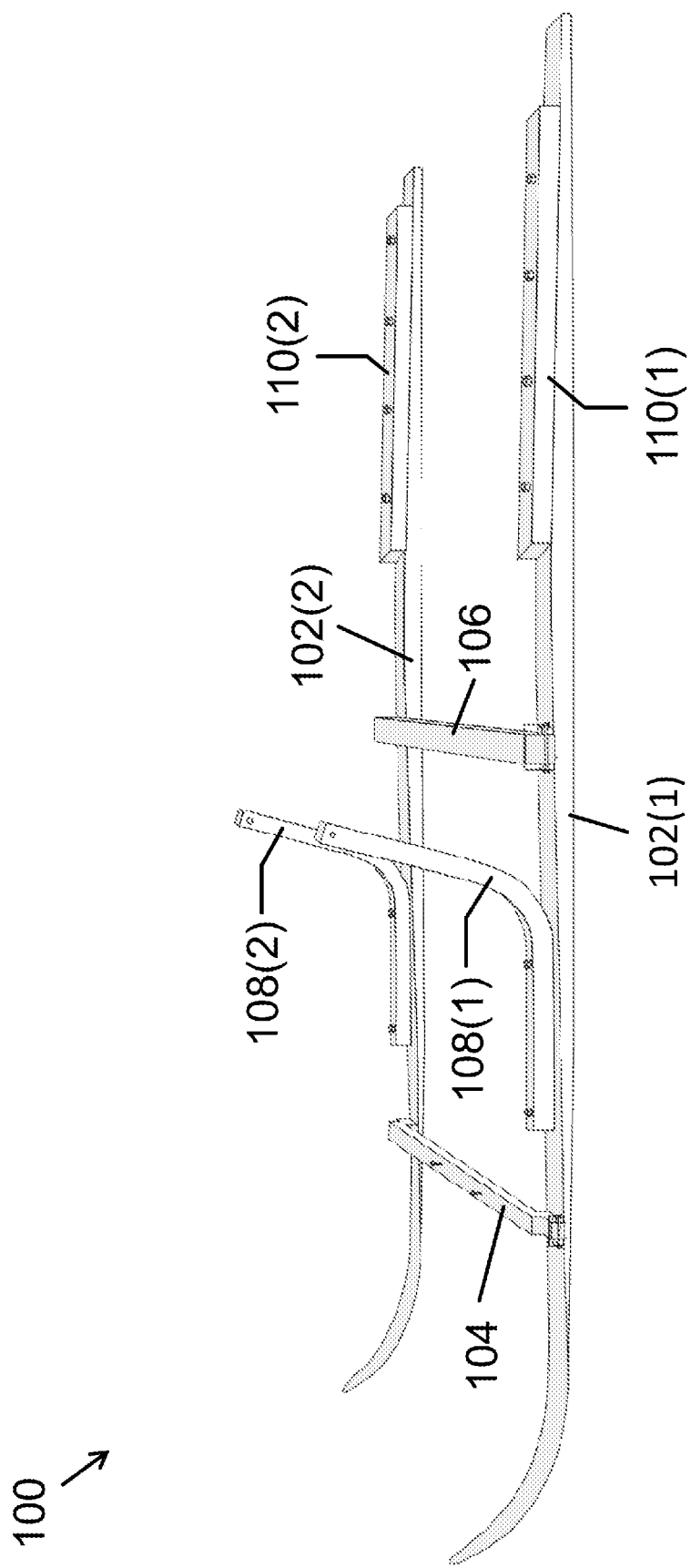
FIG. 1 is a perspective view illustrating one embodiment of an apparatus for a sled with a detachable trailer.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatuses and systems described herein. Such equivalents are considered to be within the scope of this disclosure and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

Multiple elements of the same or a similar type may be referred to as "Elements 102(1)-(n)" where n may include a number. Referring to one of the elements as "Element 102" refers to any single element of the Elements 102(1)-(n). Additionally, referring to different elements "First Elements 102(1)-(n)" and "Second Elements 104(1)-(n)" does not necessarily mean that there must be the same number of First Elements as Second Elements and is equivalent to "First Elements 102(1)-(n)" and "Second Elements (1)-(m)" where m is a number that may be the same or may be a different number than n.

FIG. 1 depicts one embodiment of an apparatus 100. The apparatus 100 may include an apparatus for a sled with a detachable trailer. The apparatus 100 may include a pair of runners, which may include a first runner 102(1) and a second runner 102(2). The runners 102(1)-(2) may be oriented substantially parallel to each other. Herein, the runner 102(1)-(2) being "substantially parallel" means that the runners 102(1)-(2) have no more than a 20 degree angle between them. The apparatus 100 may include a pair of cross members, including a first cross member 104 and a second cross member 106. Each cross member 104 or 106 may be disposed on the first runner 102(1) and the second runner 102(2).

The apparatus 100 may include a pair of trailer attachment arms, which may include a first trailer attachment arm 108(1) and a second trailer attachment arm 108(2). The first trailer attachment arm 108(1) may be disposed on the first runner 102(1). The second trailer attachment arm 108(2) may be disposed on the second runner 102(2). A trailer may be detachably connectable to the first trailer attachment arm 108(1) and the second trailer attachment arm 108(2). The apparatus 100 may include a first riding platform 110(1) and a second riding platform 110(2). The first riding platform 110(1) may be disposed on the first runner 102(1). The second riding platform 110(2) may be disposed on the second runner 102(2).

The apparatus 100 may allow a trailer to selectably attach to the apparatus 100 to allow a user to push the apparatus 100 from behind the trailer and between the runners 102(1) and 102(2) and easily transport the trailer over snowy or icy terrain. In some embodiments, the trailer may be relatively small in size such that, for example, the trailer may be of a sufficient size to hold one or more children, one or more pets, or other objects. In other embodiments, the trailer may be of a sufficient size to hold one or more adults or other larger objects. The apparatus 100 may also allow the user to stand on the riding platforms 110(1) and 110(2) and ride on the apparatus 100 for a certain distance when the apparatus 100 has reached a gliding speed. Furthermore, the apparatus 100 may overcome one or more of the disadvantages of conventional runner-equipped child and pet trailers. First, since the apparatus 100 is pushed by the user from behind the apparatus 100, the user does not use skis to pull the apparatus 100. Thus, the user does not need to know how to ski nor is the user encumbered by skis. Second, pushing the apparatus 100 from behind may be easier than pulling a conventional trailer and also allows the user to ride on the apparatus 100. Third, the user can easily access the trailer to interact with the child or pet inside, or retrieve objects carried on the apparatus 100 instead of having to detach from the harness system of a conventionally pulled ski trailer in order to walk around to access the trailer.

Figure 2:
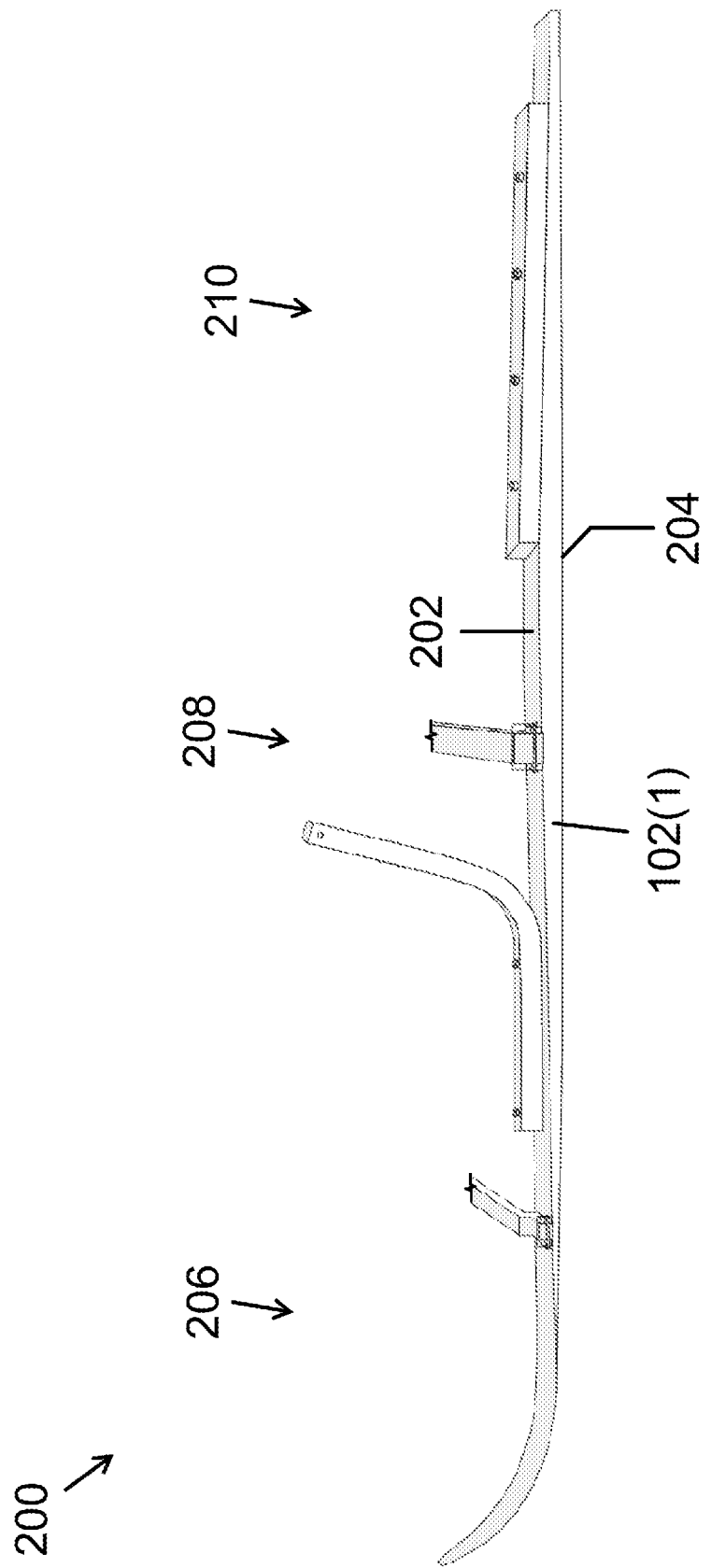
FIG. 2 is a perspective view illustrating one embodiment of a runner of an apparatus for a sled with a detachable trailer.

FIG. 2 depicts one embodiment of a portion 200 of the apparatus 100. In one embodiment, the portion 200 may include the first runner 102(1). The first runner 102(1) may include a narrow strip of rigid or semi-rigid material. The strip may be longer than it is wide. The rigid or semi-rigid material may include one or more of a plastic, a metal, wood, fiberglass, or other material.

In one or more embodiments, the first runner 102(1) may include a top side 202 and a bottom side 204. The bottom side 204 may include a smooth surface for gliding over snow or ice. The top side 202 may include one or more locations where other objects may be disposed on the first runner 102(1). The first runner 102(1) may include a front portion 206, a middle portion 208, and a back portion 210. In some embodiments, an end of the front portion 206 may curve slightly upwards. The second runner 102(2) may include components and characteristics similar to the first runner 102(1).

In one embodiment, the first runner 102(1) and the second runner 102(2) may support the apparatus 100 on a surface. The first runner 102(1) and the second runner 102(2) may allow the apparatus to glide on snow or ice.

Figure 3A:
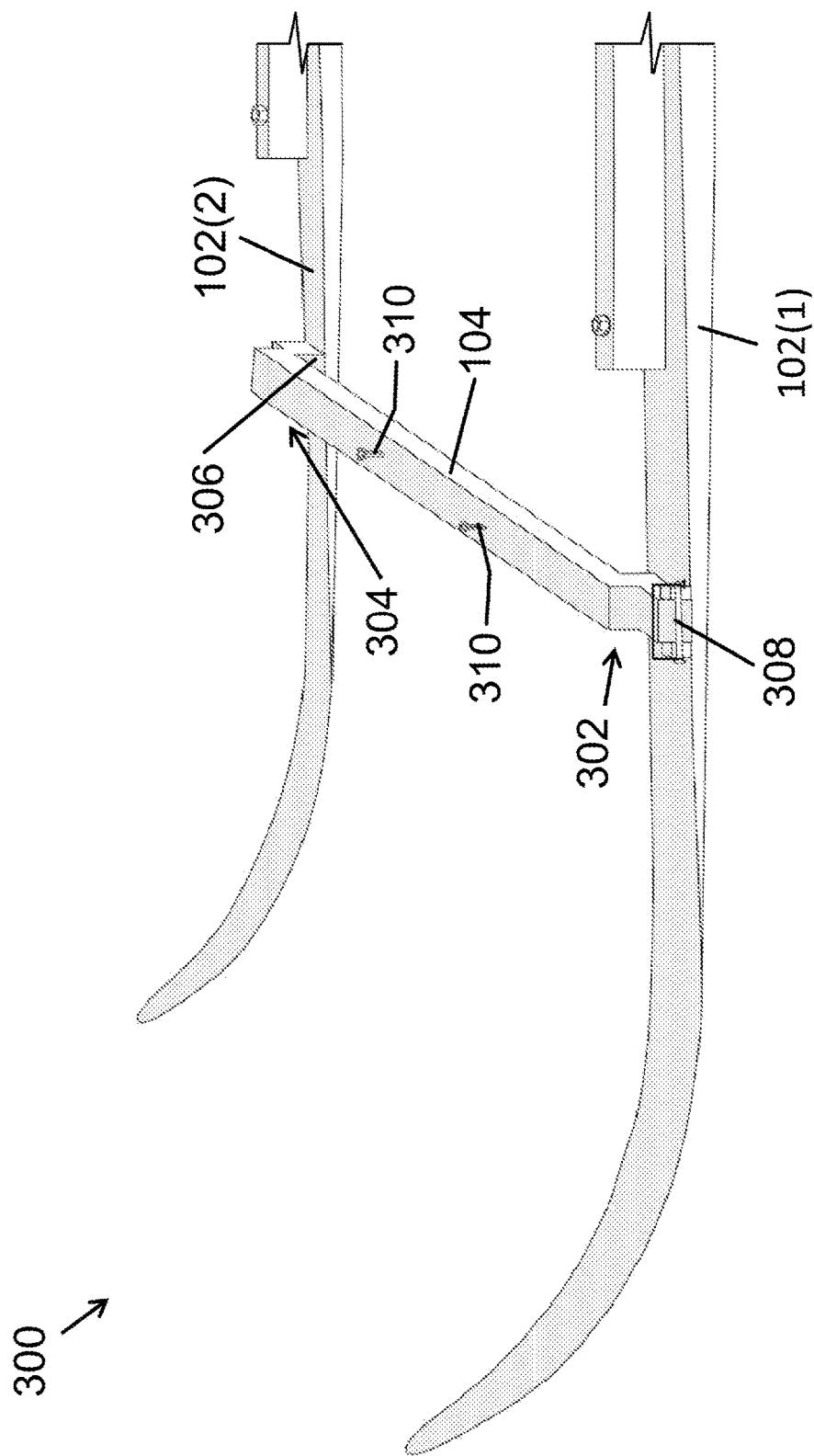
FIG. 3A is a perspective view illustrating one embodiment of a first cross member of an apparatus for a sled with a detachable trailer.

FIG. 3A depicts an embodiment of another portion 300 of the apparatus 100. In one embodiment, the first cross member 104 or the second cross member 106 may each include a beam. The beam may include an elongated piece of rigid or semi-rigid material, which may include one or more of a plastic, a metal, wood, fiberglass, or other material.

In one embodiment, the first cross member 104 or the second cross member 106 may each include a first end 302 and a second end 304 disposed opposite the first end 302. The first end 302 may be disposed on the first runner 102(1). The second end 304 may be disposed on the second runner 102(2). In some embodiments, a cross member 104 or 106 may be oriented perpendicular to a runner 102(1) or 102(2). In other embodiments, a cross member 104 or 106 may be oriented at an angle other than perpendicular to a runner 102(1) or 102(2). The first cross member 104 or the second cross member 106 may hold the runners 102(1) and 102(2) in a substantially parallel orientation.

In one embodiment, the second end 304 of a cross member 104 or 106 may include a rotatable attachment 306. The rotatable attachment 306 may allow the cross member 104 or 106 to rotate around a rotation point of the rotatable attachment 306. The rotatable attachment 306 may include a fixed swivel point, a swivel turntable, or a rotating rod fixed to the cross member 104 or 106 and runner 102(1) or 102(2).

Figure 3B:
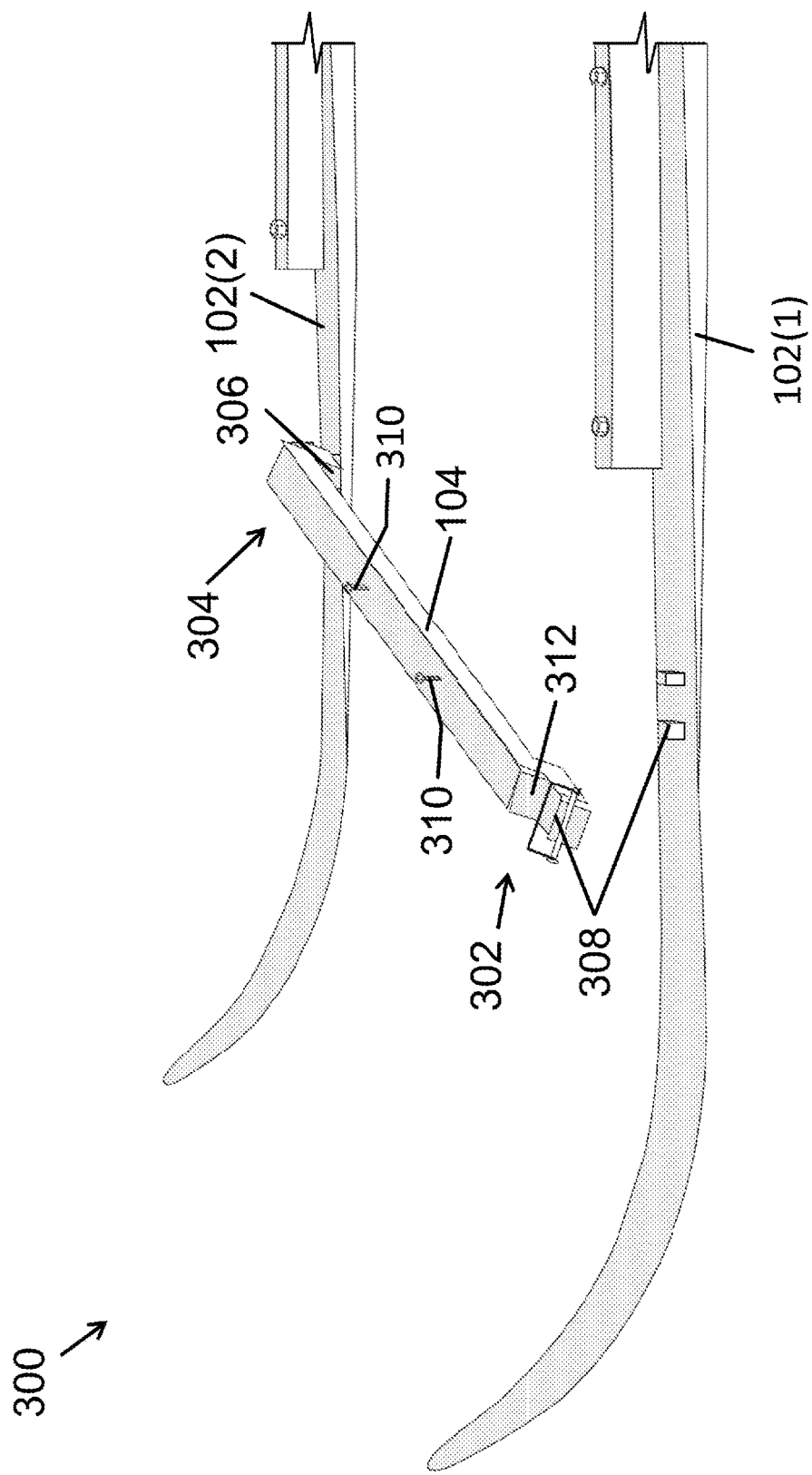
FIG. 3B is a perspective view illustrating one embodiment of the first cross member in a selectably detachable configuration.

In some embodiments, the first end 302 of a cross member 104 or 106 may include a latching mechanism 308. The latching mechanism 308 may selectably secure the first end 302 to the first runner 102(1). A latching mechanism 308 may include a hoop-style cotter pin, a push-button latch with stopper, a toggle latch clamp, elbow latch, or other mechanism that provides a secure attachment point for the first end 302 to attach to the first runner 102(1). In response to the latching mechanisms 308 of the cross members 104 and 106 detaching the first ends 302 of the cross members 104 and 106 from the first runner 102(1), the first runner 102(1) may detach from the apparatus 100. This may allow a user to repair or replace the first runner 102(1) or may allow for removal of the kick sled attachment from the trailer. FIG. 3B depicts one embodiment of the latching mechanism 308 in a detached state and the first runner 102(1) detached from the apparatus 100.

In some embodiments, the rotatable attachment 306 may be disposed on the first end 302 of a cross member 104 or 106, and the locking mechanism 308 may be disposed on the second end 304 of the same cross member 104 or 106. In some embodiments, a first rotatable attachment 306 may be disposed on a first end 302 of a cross member 104 or 106, and a second rotatable attachment 306 may be disposed on a second end 304 of the same cross member 104 or 106. In some embodiments, a first latching mechanism 308 may be disposed on the second end 304 of a cross member 104 or 106, and a second latching mechanism 308 may be disposed on the first end 302 of the same cross member 104 or 106.

In one embodiment, the first cross member 104 may be disposed on a front portion 206 of each of the first runner 102(1) and the second runner 102(2). The second cross member 106 may be disposed on a middle portion 208 of each of the first runner 102(1) and the second runner 102(2).

In one embodiment, the first cross member 104 may include an attachment point 310. A trailer may be detachably connectable to the attachment point 310. This may allow an attached trailer to be supported by a component of the apparatus 100 other than the trailer attachment arms 108(1) and 108(2). It may also allow the attached trailer to be supported in a different area than just the area of the trailer attached to the trailer attachment arms 108(1) and 108(2).

In one embodiment, the attachment point 310 may include a rod, cotter pin, or another similar component. The rod, cotter pin, or other component may extend upward from the first cross member 104. The rod may be insertable into a portion of the trailer when the trailer is connected to the trailer attachment arms 108(1) and 108(2). In another embodiment, the attachment point 310 may include a shock absorber disposed on the first cross member 104. The shock absorber may be selectably connectable to the trailer when the trailer is connected to the trailer attachment arms 108(1) and 108(2).

In one embodiment, the first cross member 104 may include a riser 312. The riser 312 may be disposed between the beam and a runner 102(1) or 102(2). The riser 312 may raise the height of the first cross member 104 from the runner 102(1) or 102(2), which may allow an attached trailer to more easily attach to the first cross member 104 or prevent the front of the trailer from plowing through snow. In some embodiments, the riser 312 may be height-adjustable to allow for trailers of different sizes or shapes to attach to the first cross member 104. The riser 312 being height-adjustable may include the riser 312 having a telescoping arm, a clamp, a jack, or other height-adjusting components.

Figure 4A:
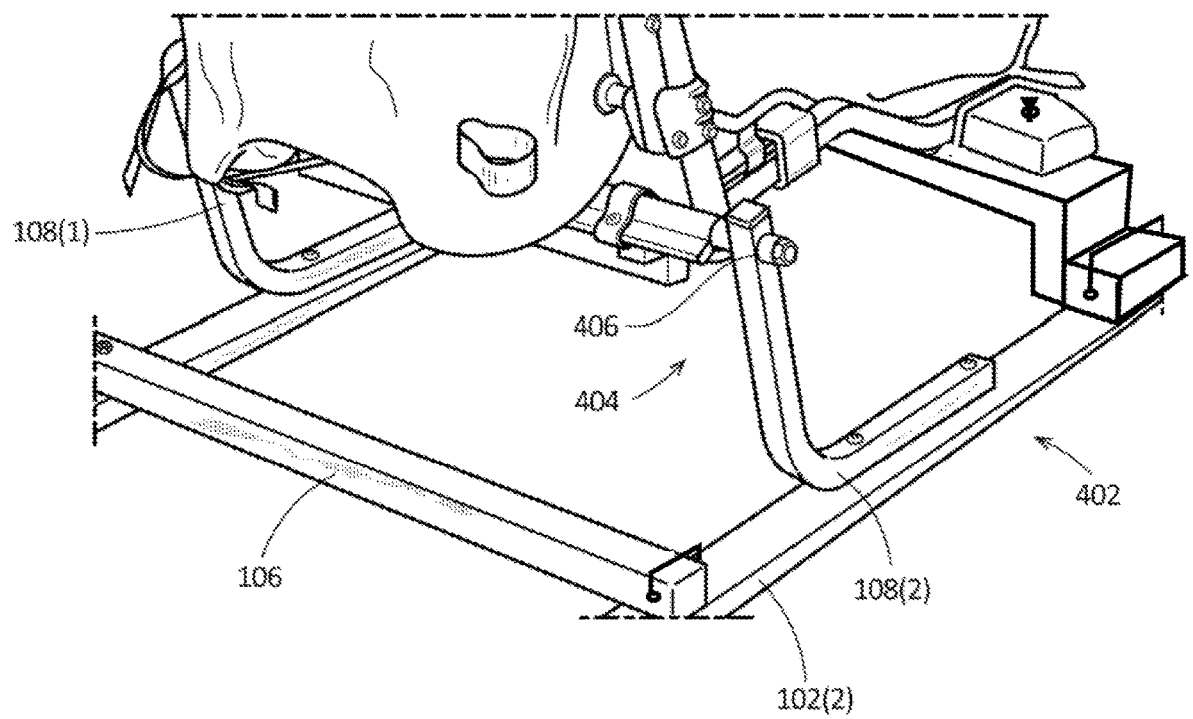
FIG. 4A is a perspective view illustrating one embodiment of trailer attachment arms of an apparatus for a sled with a detachable trailer.

FIG. 4A depicts one embodiment of a portion 400 of the apparatus 100. In one embodiment, each of the first trailer attachment arm 108(1) and the second trailer attachment arm 108(2) may include an elongated piece of rigid or semi-rigid material, which may include one or more of a plastic, a metal, wood, fiberglass, or other material. Each trailer attachment arm 108(1) and 108(2) may include a first end 402 and a second end 404 disposed opposite the first end 402. The first end 402 may be attached to its respective runner 102(1) or 102(2). The second end 404 of each trailer attachment arm 108(1) or 108(2) may extend away from the respective runner 102(1) or 102(2). For example, as depicted in FIG. 4A, the trailer attachment arm 108(1) or 108(2) may include a curved member.

Figure 4B:
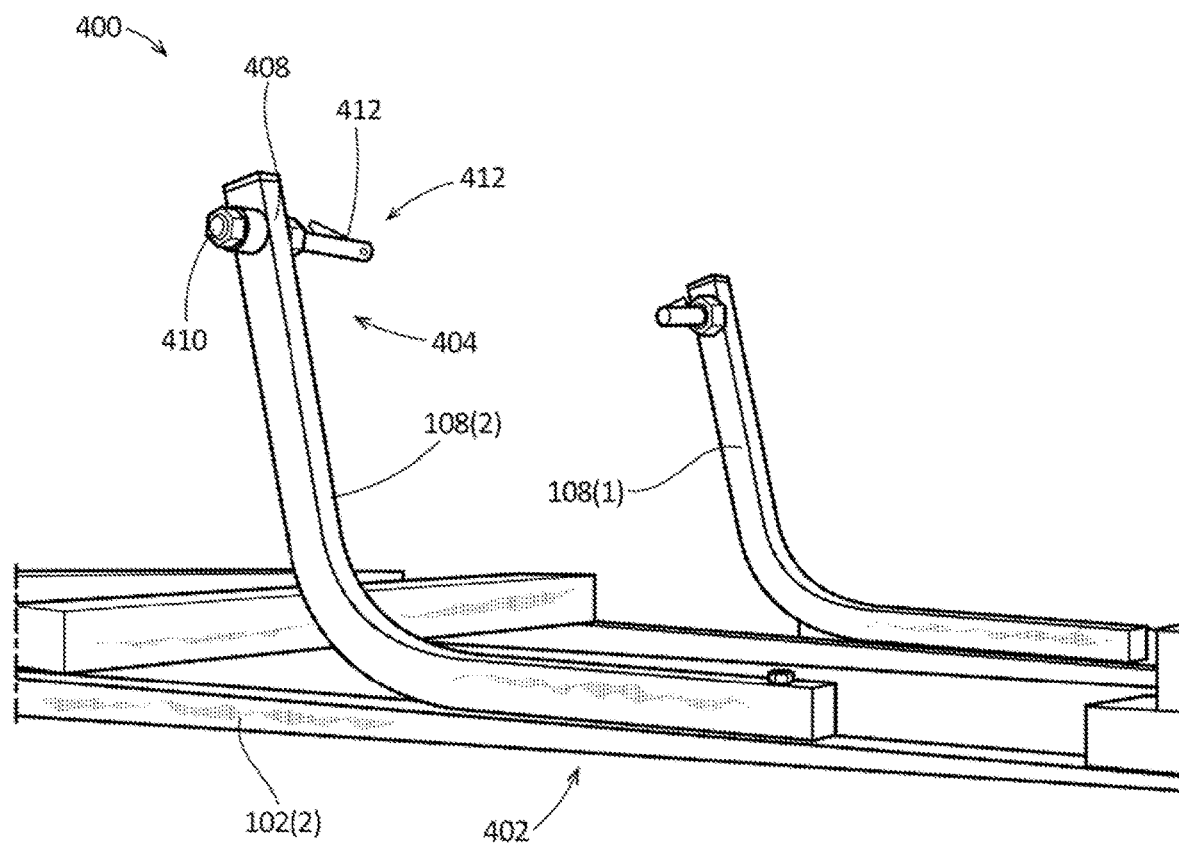
FIG. 4B is a perspective view illustrating another embodiment of the trailer attachment arms.

In one embodiment, the trailer being detachably connectable to the trailer attachment arms 108(1) and 108(2) may include each of the trailer attachment arms 108(1) and 108(2) including an attachment point 406. The attachment point 406 may include one or more components by which the trailer may selectively attach to the trailer attachment arms 108(1) and 108(2). The attachment point 406 may be disposed on the second end 404 of a trailer attachment arm 108(1) or 108(2). As depicted in FIG. 4B, which shows an alternate view of the portion 400, in one embodiment, the attachment point 406 may include an aperture. The aperture may be sized, shaped, or disposed on the second end 404 to receive a pushbutton pin 408. The pushbutton pin 408 may include a button 410 and a pin 412. In response to a user pushing on the button 410, the balls inserted into the pin at the opposite end may retract. The retraction may allow the user to withdraw the pin 412 from the aperture of the attachment arm 108(1) or (2) or to withdraw the trailer from the pin 412 and selectably detach the trailer from the second end 404. In other embodiments, the attachment point 406 may include a bolt that screws into the aperture on the second end 404 and into a portion of the trailer in order to secure the trailer to the second end 404. In other embodiments, the attachment point 406 may include a cotter pin or other mechanisms for attachment.

In one embodiment, the first riding platform 110(1) and the second riding platform 110(2) may include a flat, elongated, rigid or semi-rigid material, which may include one or more of a plastic, a metal, wood, fiberglass, or other material. A riding platform 110(1) or 110(2) may include a width wider than the width of the runner 102(1) or 102(2) on which the riding platform 110(1) or 110(2) is disposed. Each riding platform 110(1) or 110(2) may be disposed on its respective runner 102(1) or 102(2) on a top and back portion 210 of the runner 102(1) or 102(2).

In one embodiment, the riding platforms 110(1) and 110(2) may provide a location on the apparatus 100 where the user can ride the apparatus 100. In some embodiments, the user may push the apparatus 100 from behind. The user may push on one or more handles disposed on the attached trailer or disposed on the apparatus 100 itself. The user may push the apparatus 100 while running between the riding platforms 110(1) and 110(2). In response to the apparatus 100 reaching a sufficient speed such that the apparatus 100 glides over the snow or ice without further pushing by the user, or in response to the apparatus 100 traversing slopped terrain such that the apparatus 100 glides down the slope, the user may move his or her legs onto the riding platforms 110(1) and 110(2) and ride on the apparatus 100.

Figure 5A:
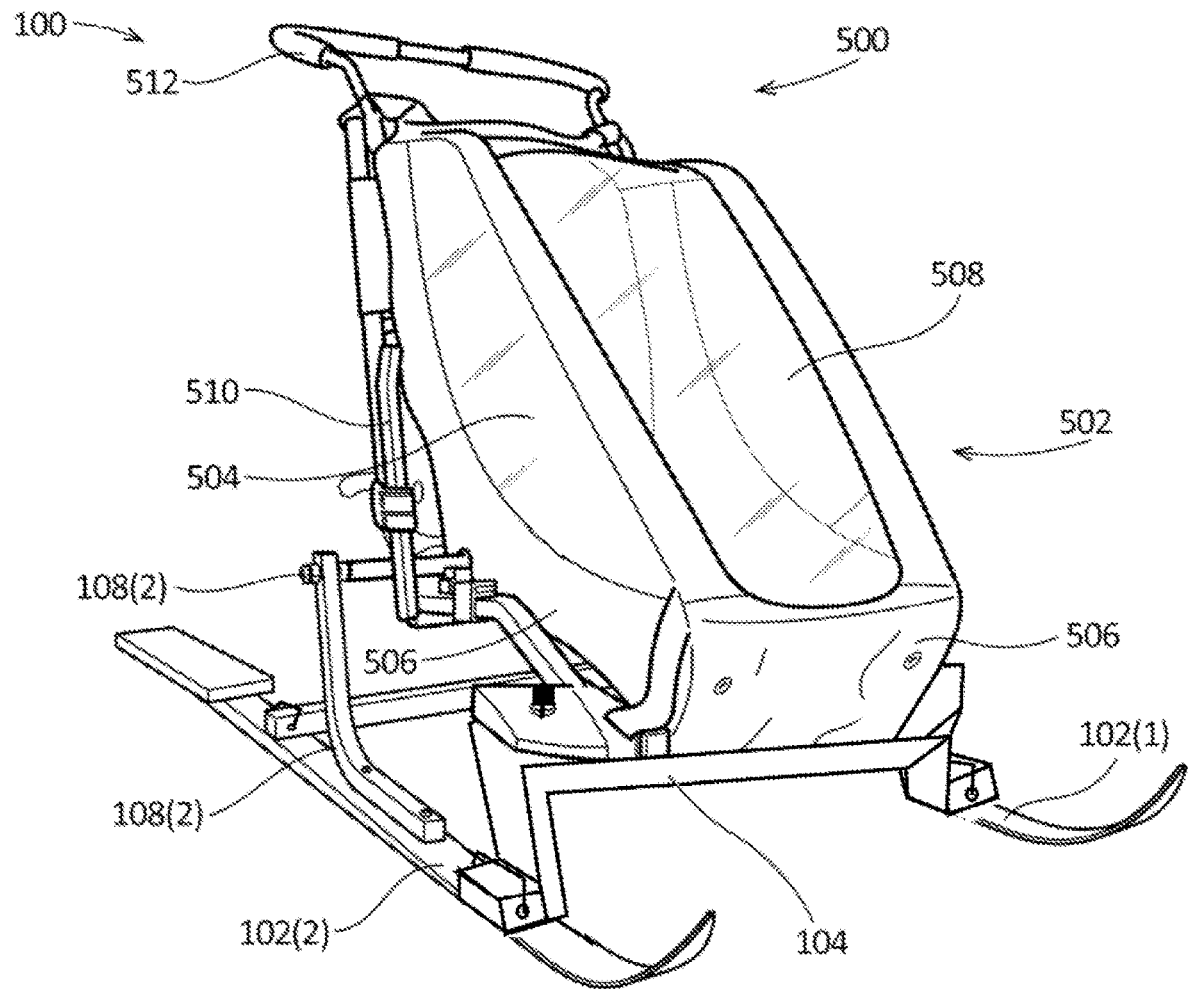
FIG. 5A is a perspective view illustrating one embodiment of an apparatus for a sled with a detachable trailer with a trailer disposed on the apparatus.
Figure 5B:
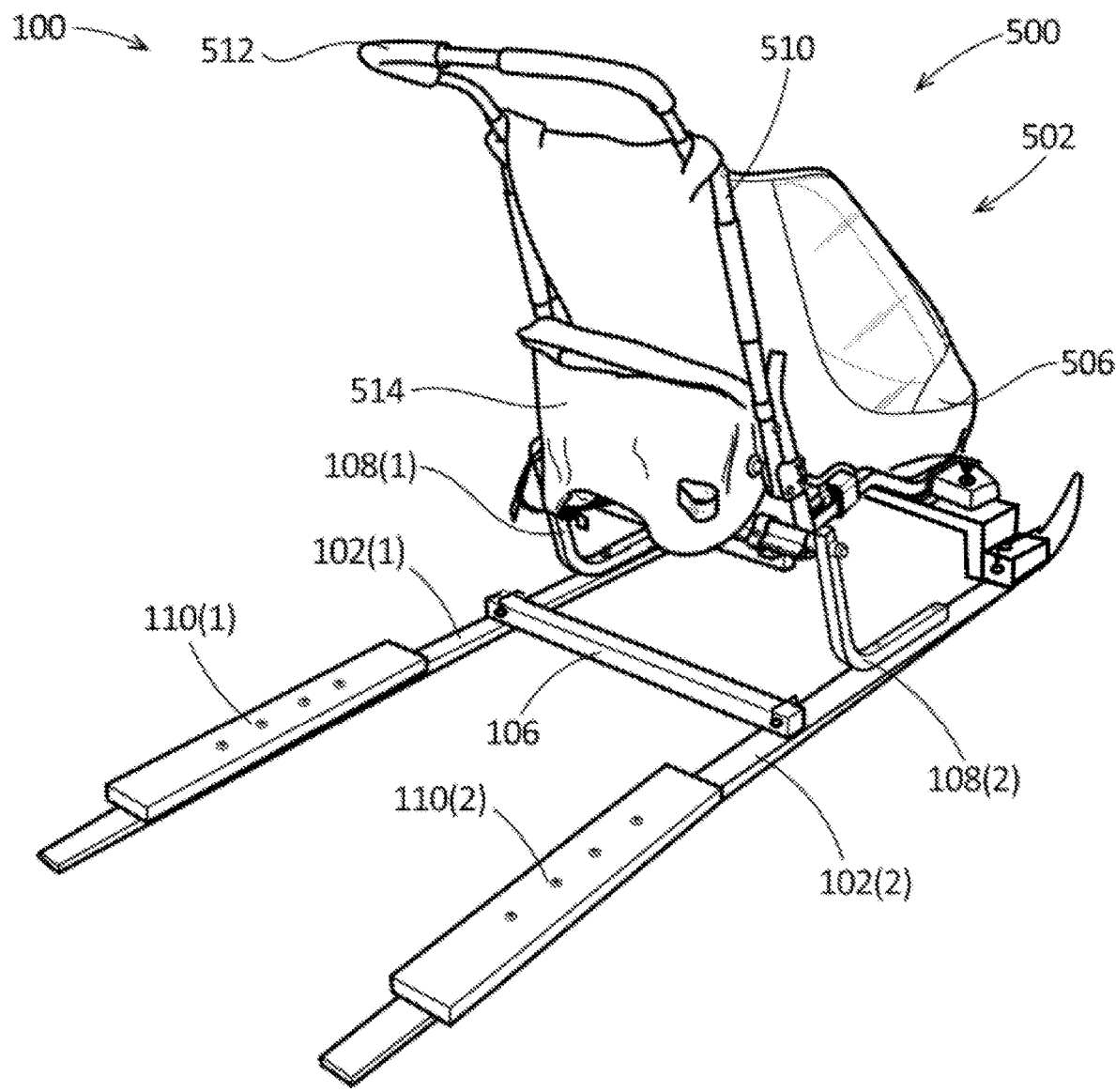
FIG. 5B is a perspective view illustrating another embodiment of an apparatus for a sled with a detachable trailer with the trailer disposed on the apparatus.

FIG. 5A and FIG. 5B depict various views of the apparatus 100. In one embodiment, the apparatus 100 may include the trailer 500. The trailer 500 may include an enclosure 502. The enclosure 502 may be sized and shaped to hold a child, a small pet, or objects. The trailer 500 may include a seat 504. The seat 504 may be disposed within the enclosure 502. The seat 504 may include safety straps, belts, or other restraints. The seat 504 may provide a location where a child, pet, or other objects may sit within the enclosure 502. The enclosure 502 may include one or more walls 506 and one or more flaps 508. The enclosure 502 may include one or more fasteners (such as buttons or zippers) that may close the one or more flaps 508 to the enclosure 502. The enclosure 502 may include materials such as plastic, cloth, rubber, waterproof fabric, clear vinyl, metal, or other materials.

In one embodiment, the trailer 500 may include a frame 510. The frame 510 may include one or more rigid or semi-rigid materials, such as a plastic, a metal, wood, fiberglass, or other material. The frame 510 may attach to various points on the enclosure 502 to shape the enclosure 502. The frame 510 may include a handle 512 for the user to push when using the apparatus 100. The frame 510 may include components that may selectably connect to an attachment point 310 of the first cross member 104 or an attachment point 406 of a trailer attachment arm 108(1) or 108(2). The trailer 500 may include a storage area 514. The storage area 514 may include a pocket, a pouch, or other type of storage area for storing objects. The storage area 514 may be disposed on the backside of the trailer 500 (i.e., the side of the trailer 500 facing toward the user when the user is pushing the apparatus 100.

In some embodiments, the trailer 500 may be connected to the trailer attachment arms 108(1) and 108(2) such that the trailer 500 is not detachable (or, at least, not detachable without the use of tools or other equipment).

In one embodiment, the apparatus 100 may include a handle. The handle may include an extension of the second end 404 of the trailer attachment arms 108(1) and 108(2). The handle may include a handle disposed on the trailer 500, such as the handle 512, discussed above.

Thus, although there have been described particular embodiments of the present disclosure of new and useful APPARATUSES AND SYSTEMS FOR A KICKSLED WITH A DETACHABLE TRAILER, it is not intended that such references be construed as limitations upon the scope of this disclosure.

What is claimed is:

1. An apparatus, comprising:
    a pair of runners, including
        a first runner, and
        a second runner,
        wherein the first runner and the second runner are oriented substantially parallel to each other;
    a first cross member, including
        a first end, and
        a second end disposed opposite the first end on the first cross member,
        wherein the first end is disposed on the first runner, and the second end is disposed on the second runner;
    a pair of trailer attachment arms, including
        a first trailer attachment arm disposed on the first runner, and
        a second trailer attachment arm disposed on the second runner,
        wherein a trailer is detachably connectable to the first trailer attachment arm and the second trailer attachment arm, and wherein the first cross member comprises an attachment point, and the trailer is detachably connectable to the attachment point; and
    a first riding platform disposed on the first runner.

2. The apparatus of claim 1, wherein the first cross member is disposed on a front portion of each of the first runner and the second runner.

3. The apparatus of claim 2, further comprising a second cross member, wherein:
    the second cross member includes a first end, and a second end disposed opposite the first end of the second cross member; and
    the first end of the second cross member is disposed on a middle portion of the first runner, and the second end of the second cross member is disposed on a middle portion of the second runner.

4. The apparatus of claim 3, further comprising a second rotatable attachment that connects the first end of the second cross member to the first runner.

5. The apparatus of claim 1, wherein:
    the attachment point comprises a rod extending upward from the first cross member; and
    the rod is insertable into a portion of the trailer when the trailer is connected to the first trailer attachment arm and the second trailer attachment arm.

6. The apparatus of claim 1, wherein:
    the attachment point comprises a shock absorber disposed on the first cross member; and
    the shock absorber is selectably connectable to the trailer when the trailer is connected to the first trailer attachment arm and the second trailer attachment arm.

7. The apparatus of claim 1, wherein:
each of the first trailer attachment arm and the second trailer attachment arm includes a first end and a second end disposed opposite the first end of the respective trailer attachment arm;
the first end of each trailer attachment arm is attached to the respective runner; and
the second end of each trailer attachment arm extends away from the respective runner.

8. The apparatus of claim 7, wherein each of the first trailer attachment arm and the second trailer attachment arm includes a curved member.

9. The apparatus of claim 1, wherein the trailer being detachably connectable to the first trailer attachment arm and the second trailer attachment arm comprises each of the first trailer attachment arm and the second trailer attachment arm including a means for detachably attaching the trailer to the respective trailer attachment arm disposed on the respective trailer attachment arm.

10. The apparatus of claim 1, further comprising a second riding platform disposed on the second runner.

11. The apparatus of claim 10, wherein:
the first riding platform being disposed on the first runner includes the first riding platform being disposed on a top and back portion of the first runner; and
the second riding platform being disposed on the second runner includes the second riding platform being disposed on a top and back portion of the second runner.

12. An apparatus, comprising:
a pair of runners, including
a first runner, and
a second runner,
wherein the first runner and the second runner are oriented substantially parallel to each other;
a pair of cross members including a first cross member and a second cross member, wherein each of the first cross member and the second cross member includes
a first end, and
a second end disposed opposite the first end on the respective cross member,
wherein the first end is disposed on the first runner, and the second end is disposed on the second runner;
a pair of trailer attachment arms, including
a first trailer attachment arm disposed on the first runner, and
a second trailer attachment arm disposed on the second runner;
a trailer connected to the first trailer attachment arm and the second trailer attachment arm, wherein the first cross member comprises an attachment point, and the trailer is connected to the attachment point; and
a pair of riding platforms including a first riding platform and a second riding platform, wherein
the first riding platform is disposed on a top and back portion of the first runner; and
the second riding platform is disposed on a top and back portion of the second runner.

13. The apparatus of claim 12, wherein the first cross member is disposed on a front portion of each of the first runner and the second runner.

14. The apparatus of claim 12, wherein the second cross member is disposed on a middle portion of each of the first runner and the second runner.

15. The apparatus of claim 12, wherein:
each of the first trailer attachment arm and the second trailer attachment arm includes a first end and a second end disposed opposite the first end of the respective trailer attachment arm;
the first end of each trailer attachment arm is attached to the respective runner; and
the second end of each trailer attachment arm extends away from the respective runner.

16. The apparatus of claim 12, wherein the trailer comprises:
an enclosure; and
a seat disposed within the enclosure.

17. The apparatus of claim 12, wherein:
the trailer comprises a frame, wherein the trailer connects to the first trailer attachment arm and the second trailer attachment arm via the frame; and
the trailer further comprises a handle.

18. An apparatus, comprising:
a pair of runners, including
a first runner, and
a second runner,
wherein the first runner and the second runner are oriented substantially parallel to each other;
a first cross member, including
a first end, and
a second end disposed opposite the first end on the first cross member,
wherein the first end is disposed on the first runner, and the second end is disposed on the second runner, and wherein a first rotatable attachment connects the first end of the first cross member to the first runner;
a pair of trailer attachment arms, including
a first trailer attachment arm disposed on the first runner, and
a second trailer attachment arm disposed on the second runner,
wherein each of the first trailer attachment arm and the second trailer attachment arm includes a means for detachably connecting a trailer to the respective trailer attachment arm; and
a first riding platform disposed on the first runner and a second riding platform disposed on the second runner.

19. The apparatus of claim 18, wherein the first cross member is disposed on a front portion of each of the first runner and the second runner.

20. The apparatus of claim 18, further comprising a second rotatable attachment that connects the first end of the second cross member to the first runner.

* * * * *